TELEVISION DEFLECTION SYSTEM

Filed Dec. 11, 1951

INVENTORS
George W. Fyler
Lowell S. Kongable
BY
Foorman L. Mueller
Atty

Patented June 30, 1953 2,644,103

UNITED STATES PATENT OFFICE 2,644,103

TELEVISION DEFLECTION SYSTEM

George W. Fyler, Lombard, and Lowell S. Kongable, La Grange, Ill., assignors to Motorola, Inc., Chicago, Ill., a corporation of Illinois Application December 11, 1951, Serial No. 260,996

15 Claims. (Cl. 315—24)

Figures 1, 2:
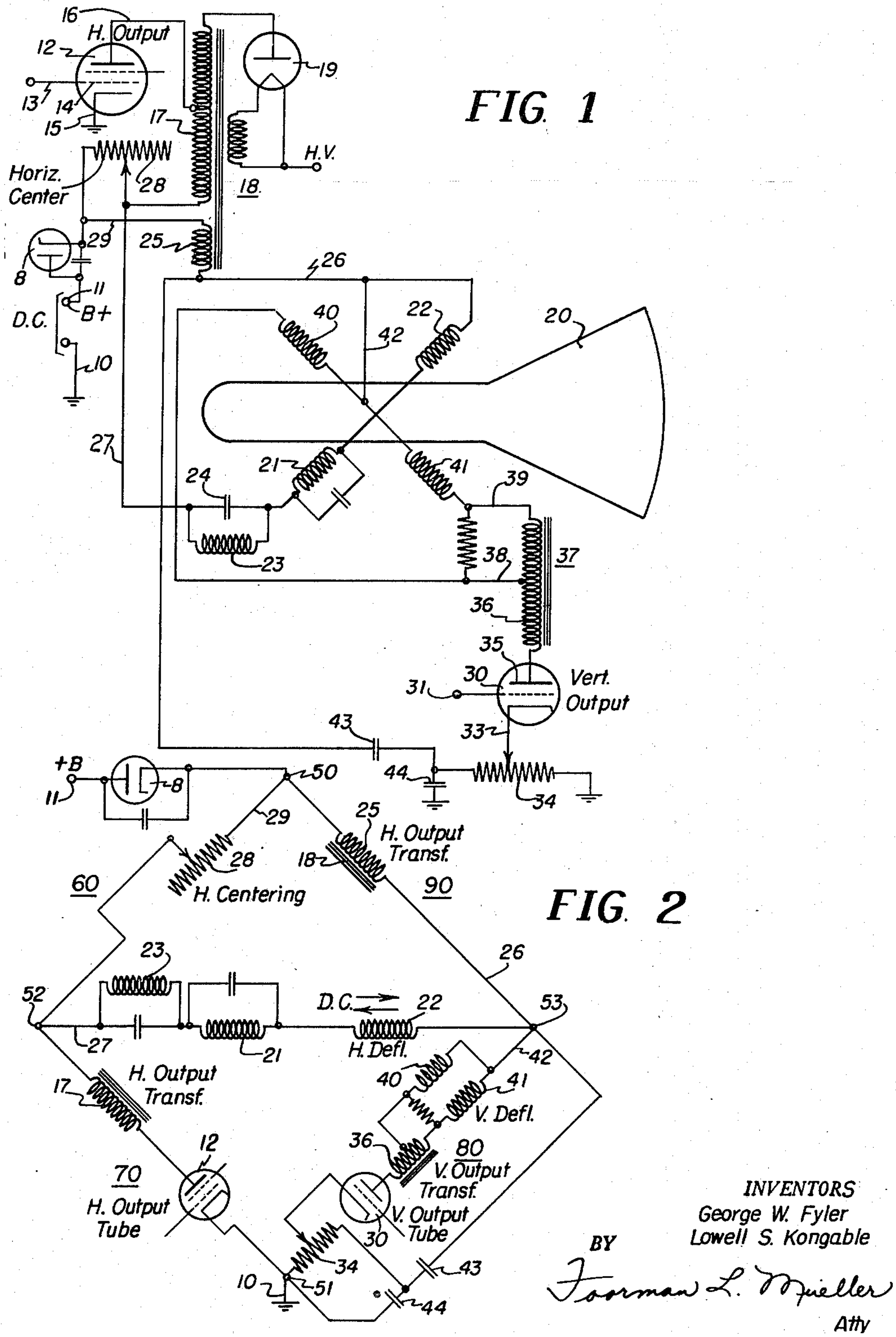

The present invention relates to deflection circuits for magnetically deflected cathode ray tubes, and more particularly to an improved horizontal deflection circuit providing for electrical centering in the horizontal direction of the beam of a magnetically deflected cathode ray picture tube such as used in television receivers.

There is an inherent tendency for the picture produced on a magnetically deflected picture tube of a television receiver to be displaced horizontally to the left. This inherent tendency is believed to be caused by; 1, the earth's magnetic field; 2, the horizontal blanking of the television system which produces a wider margin on the right of the picture because of the front porch and the duration of the synchronization pulse and; 3, the deflection system which tends to produce a slight picture blowout to the left. In addition, the electron gun of the cathode ray tube may be somewhat off-center in a direction to shift the picture horizontally to the left or right. In the more recent television receiver circuits the vertical deflection output tube may obtain its power from the horizontal deflection circuit through the horizontal deflection coils to thereby cause an additional shifting of the picture horizontally to the left unless a blocking condenser is used in a manner to prevent direct current flow through the deflection coils. It is thus apparent that the provision of a horizontal centering control particularly adapted to shift the picture center horizontally to the right is of considerable importance in the design of a television receiver.

It is an object of the present invention to provide an improved and simplified electrical centering circuit for horizontal deflection systems of magnetically deflected cathode ray tubes.

Another object of the invention is to provide an improved electrical centering circuit for the horizontal deflection system of a magnetically deflected television picture tube, which circuit is particularly effective to shift the picture center horizontally to the right.

A feature of the invention is the provision of a bridge circuit for supplying the energizing currents to the deflection power output tubes of a television receiver using a magnetically deflected cathode ray tube. The bridge has an adjustable resistance leg and the horizontal deflection coils are connected across the diagonal of the bridge so that unbalanced conditions of the bridge controlled by the adjustable resistance leg are effective to cause adjustable amounts of direct current to flow through the horizontal deflection coils in either direction for shifting the center position of the beam.

Another feature of the invention as applied to a television receiver having a magnetically deflected picture tube is the provision of a circuit interconnecting the horizontal deflection power output tube, the vertical deflection power output tube, and the horizontal deflection coils in such manner that adjustable portions of the direct current required to energize the horizontal deflection power output tube may pass through the horizontal deflection coils in one direction or adjustable portions of the direct current required to energize the vertical deflection power output tube may pass through the horizontal deflection coil in the other direction to provide a centering adjustment of the picture in a selected horizontal direction.

Inasmuch as the horizontal deflection output tube customarily requires several times the energizing current required by the vertical deflection output tube, another feature of the invention is the manner of interconnecting the vertical and horizontal deflection output tubes with the horizontal deflection coils such that the direct current flow through the horizontal deflection coils of the current for the horizontal output tube is in the direction to provide a greater shift of the picture horizontally to the right to compensate for the more pronounced tendency of the picture to be centered horizontally to the left.

Further objects, features and the attending advantages of the present invention will be apparent with reference to the following specification and drawings in which:

Fig. 1 is a schematic wiring diagram of the deflection system of the invention for use with a magnetically deflected television picture tube; and Fig. 2 is similar to Fig. 1 but redrawn to illustrate the resistance bridge circuit of Fig. 1.

According to the invention, the horizontal deflection power output tube is supplied mainly with energizing current through a series circuit including the primary winding of the horizontal deflection output transformer and an adjustable centering resistance. The horizontal deflection output tube is also connected to the source of direct current in a manner to be mainly energized thereby by means of a series circuit which may include the primary winding of the horizontal output transformer, the series connected pair of horizontal deflection coils and the secondary winding of the horizontal output transformer. The vertical deflection power output tube is supplied with energizing direct current by means of the series circuit including the vertical deflection output transformer, portions of the vertical deflection coils, and the secondary winding of the horizontal sweep output transformer. The vertical sweep power output tube may also be supplied with energizing direct current through the series circuit comprising the vertical output transformer, portions of the vertical sweep deflection coils, the series connected horizontal sweep deflection coils and the adjustable horizontal centering resistance. In such manner a bridge circuit is formed having bridge input terminals connected across the source of direct current for energizing the deflection output tubes and bridge output terminals across which the series connected horizontal deflection coils are connected. By adjusting the adjustable centering resistance the bridge may be unbalanced in either direction to provide adjustable amounts of centering direct current through the horizontal deflection coils in either direction.

Referring to Fig. 1 of the drawings for a more detailed description of the invention, the source of direct current is fed through the damper tube 8. A horizontal deflection power output tube 12 of the conventional tetrode type is used to provide the power amplification for horizontal sweep voltage appearing across terminal 13 and ground to be applied to the control grid 14 of the tube 12. The cathode 15 of the horizontal deflection power output tube 12 is grounded and the plate 16 is connected to the primary winding 17 of the horizontal deflection power output transformer 18. The horizontal deflection power output transformer 18 may be of the flyback type providing for the energization of the high voltage rectifier tube 19 in the conventional manner.

A magnetically deflected cathode ray picture tube 20 is provided with a pair of series connected horizontal deflection coils 21 and 22 to form the horizontal deflection magnetic field for the election beam of the picture tube. The series connected pair of horizontal deflection coils 21 and 22 are connected in series with a linearity circuit including the inductance 23 and condenser 24, and to the secondary winding 25 of the horizontal deflection power output transformer 18. Tracing this alternating current horizontal deflection circuit in detail, the primary alternating current path is from the plate of tube 12 through the transformer winding 17, adjustable resistor 28, transformer winding 25 and condensers 43 and 44 to ground. The windings 17 and 25 together form the transformer primary and the winding 25 is the transformer secondary to thereby constitute an auto transformer. It will be seen that the horizontal deflection coil 22 is connected by line 26 to one end of the secondary winding 25 and the horizontal deflection coil 21 is connected through the linearity circuit including the inductance 23 and condenser 24 to line 27, to the adjustable tap on the horizontal centering resistance 28 and through line 29 to the other end of the secondary winding 25.

It should now be apparent that under certain conditions of operation and adjustable positions of the resistance 28, direct current from the damper tube cathode may flow through the horizontal deflection coils 21 and 22 to the primary winding 17 and the horizontal deflection power output tube 12.

In order to provide vertical deflection for the beam of the television picture tube 20 a vertical deflection power output tube 30 which may be of the triode type is used and its control grid is adapted to be connected by the terminal 31 to a source of vertical deflection voltage. The cathode 33 of the vertical deflection power output tube 30 is connected through an adjustable linearity resistance 34 to ground and its plate 35 is connected to one end of the winding 36 of a vertical deflection power output transformer 37. The winding 36 of the vertical deflection power output transformer 37 is provided with output terminals 38 and 39 across which the vertical deflection coils 40 and 41 are connected in series. The energizing direct current drawn by the vertical deflection power output tube 30 may be supplied from the damper tube cathode through the secondary winding 25 of the horizontal deflection output transformer, lines 26 and 42, the direct current parallel circuit including vertical deflection coils 40 and 41 and the circuit 36 of the vertical deflection power output transformer 37. The direct current circuit through the deflection coils 40 and 41 being connected as shown to line 42 is such that the divided current flow through each of the deflection coils 40 and 41 is in the direction to produce opposing magnetizing effects which cancel each other to prevent any vertical deflection of the beam of the picture tube by such direct current. Under certain conditions of operation and with certain settings of the adjustable horizontal centering resistance 28, it will be apparent that portions of the energizing direct current for the vertical deflection power output tube 30 may be drawn from the damper tube cathode through the series circuit including the vertical deflection coils 40, 41, connection 42, horizontal deflection coils 22 and 21, linearity coil 23 and line 27 to the adjusted portion of the horizontal centering resistance 28.

In order that the operation of the circuit of Fig. 1 under various conditions of adjustment for the horizontal centering resistance 28 may be clearly understood, reference is made to Fig. 2 of the drawings which is a version of the circuit of Fig. 1 redrawn in the form of a resistance bridge as actually constituted by the circuit of Fig. 1. In order to better understand the invention, the same reference numerals have been applied to the elements of Fig. 2 of the drawings which are identical to the elements in Fig. 1 of the drawings. It will be seen that a direct current resistance bridge circuit having input terminals 50 and 51 and output terminals 52 and 53 is provided. The bridge input terminals 50 and 51 are connected across the terminal 10 and damper tube cathode of the direct current source. The horizontal deflection coils 21 and 22 are connected in series with the linearity inductance 23 across the output terminals 52 and 53 of the direct current resistance bridge circuit. The four resistance bridge legs are generally identified by the numerals 60, 70, 80 and 90, respectively. Bridge leg 60 is comprised of the adjustable horizontal centering resistance 28. The bridge leg 70 is comprised of the internal resistance of the plate-cathode circuit of the horizontal deflection output tube 12 and the resistance of the primary winding 17 of the horizontal deflection output transformer. Resistance bridge leg 80 is comprised of the total series resistance including the linearity resistance 34, the internal resistance of the plate-cathode circuit of the vertical deflection power output tube 30, the resistance of the vertical deflection output transformer circuit and the parallel connected D. C. resistance of the vertical deflection coils 40 and 41. The resistance bridge leg 90 is comprised of the fixed resistance of the secondary winding 25 of the horizontal deflection output transformer.

To illustrate the operation of the invention, the system may include a horizontal output tube of the 25BQ6FT type which requires plate current of the order of 90 milliamperes in order to provide the required horizontal deflection for a 16-inch picture tube. Therefore, the current required through the leg 70 of the bridge must be of the order of 90 milliamperes. The vertical deflection system includes one triode section of a double triode tube of the 12BH7 type and in order to provide the required vertical deflection, this tube draws a plate current of the order of 12 milliamperes. Accordingly, the current through the leg 80 of the bridge must be of the order of 12 milliamperes. The current relationships in the two legs 70 and 80 can also be stated as effective resistances, with the resistance of leg 70 being much less than that of leg 80. The direct current resistance of the horizontal output transformer secondary 25 is of the order of 22 ohms and the direct current resistance of the deflection coils 21 and 22 and the inductance 23 in series therewith is of the order of 50 ohms. When using these values, the required centering current can be provided by the use of a variable resistor in the leg 60 having a maximum value of 50 ohms.

Now assuming that the centering resistor 28 has zero resistance, or is completely out of the circuit, then the leg 70 will be connected directly across the D. C. supply and the 90 milliamperes required thereby will be drawn directly from the power supply. The 12 milliamperes required in the leg 80 will be supplied through the leg 90 and also through the diagonal of the bridge including the deflection coils 21 and 22. This will cause a current flowing to the right in Fig. 2, and the current in this direction will shift the picture horizontally to the left. This current will be a maximum of about 4 milliamperes since the resistance of the diagonal is greater than the resistance of the leg 90 and most of the current will flow through the leg 90.

When the centering resistor is adjusted to have the maximum resistance of 50 ohms, the current required in the leg 70 will be supplied partly through the leg 60 and partly through the leg 90 in series with the diagonal connection which includes the deflection coils. Since the resistance of the leg 60 is greater than the resistance of the leg 90, and since the resistance of the diagonal is in series with leg 90, about half the current will tend to flow through the leg 90. As the current required in the leg 70 is greater than that in the leg 80, a portion of the current in the leg 90 will flow to the left through the diagonal of the bridge to contribute to the current required in the leg 70. This causes current through the deflection coils in a direction to center the same to the right. The values of the various legs are such that the current available for centering to the right is relatively large because of the heavy current required in the leg 70 of the bridge.

From the above it will be apparent that as the resistance of the centering resistor 28 varies from a minimum value to a maximum value, the centering current through the deflection coils will first flow to the right, gradually decrease to zero, and then flow to the left and reach a value much greater than the original current flowing to the right. Actually, the current is balanced out when the resistance 28 has a small value on the order of 5 ohms and then flows to the left for all greater values to provide the required centering current for the system.

It should be understood that the resistance values together with the voltage and current values given for the bridge circuit in the deflection system of the invention is entirely arbitrary and have been mentioned solely for the purpose of illustrating the operation of the invention. The actual values of resistance, voltage, and current will, of course, vary considerably with the different components used in different television receiver designs. The salient feature of the invention, however, is the provision of a circuit whereby adjustable amounts of direct current flowing in either direction may be passed through the series connected horizontal deflection coils to energize, respectively, either the horizontal deflection power output tube or the vertical deflection power output tube in a manner to provide a horizontal centering control of the deflection of the beam of a cathode ray tube or television picture tube. It should be obvious that modifications may be made without departing from the spirit of the invention and the scope of the appended claims.

We claim:

1. In a deflection system for cathode ray tubes of the magnetically deflected type and having two pairs of deflection coils, each pair of deflection coils being adapted to deflect the cathode ray in a direction at right angles to the deflection by the other pair of deflection coils, the cathode ray centering circuit for passing an adjustable amount of direct current in either direction through one pair of said deflection coils including in combination, a source of direct current, impedance means having fixed resistance, an adjustable resistance, a first electron tube, a second electron tube, means connecting the internal resistances of each of said electron tubes in series with said one pair of deflection coils and said source of direct current, said connecting means also connecting said adjustable resistance in series with the internal resistance of said first electron tube and said source of direct current, said connecting means further connecting said impedance means having fixed resistance in series with the internal resistance of said second electron tube and said source of direct current, to thereby form a resistance bridge circuit having input terminals connected across the source of direct current, said one pair of deflection coils having a first terminal connected between said adjustable resistance and said first tube and a second terminal connected between said impedance and said second tube and forming the output circuit of said bridge circuit whereby adjustment of said adjustable resistance to unbalance the bridge circuit in either direction causes an adjustable amount of direct current to flow through said one pair of deflection coils in either direction for centering the deflection of the cathode ray.

2. In a deflection system for cathode ray tubes of the magnetically deflected type and having two pairs of deflection coils including a first pair of series connected deflection coils being adapted to deflect the cathode ray in a direction at right angles to the deflection by a second pair of deflection coils, the cathode ray deflection centering circuit for passing an adjustable amount of direct current in either direction through said first pair of deflection coils including in combination, a source of direct current, impedance means having fixed resistance, an adjustable resistance, a first electron tube, a second electron tube, means connecting the internal resistance of said first electron tube in series with said first pair of series connected deflection coils, means connecting the internal resistance of said second electron tube in series with said second pair of deflection coils and said first pair of series connected deflection coils, means connecting the internal resistance of said first electron tube in series with said adjustable resistance and said source of direct current, and means connecting the internal resistance of said second electron tube in series with said second pair of deflection coils and said impedance means to said source of direct current to form a resistance bridge circuit having input terminals connected across the source of direct current, said first pair of series connected deflection coils having a first terminal connected between said adjustable resistance and said first tube and a second terminal connected between said impedance means and said second tube and forming the output circuit of said bridge circuit, whereby adjustment of said adjustable resistance to unbalance the bridge circuit in either direction is effective to cause an adjustable amount of direct current to flow through said first pair of series connected deflection coils in either direction to shift the centered deflection of the cathode ray in either of opposite directions.

3. In a television receiver having a cathode ray picture tube of the magnetically deflected type and a deflection system therefor including horizontal deflection coils and vertical deflection coils the horizontal centering system including in combination; a source of direct current; a horizontal deflection output tube; a horizontal deflection output transformer; said transformer having a primary winding and a secondary winding; means connecting the internal resistance of said horizontal deflection tube with said primary winding, said horizontal deflection coils, and said secondary winding in series across said source of direct current; an adjustable horizontal centering resistance; means connecting the internal resistance of said horizontal deflection tube, said primary winding, and said adjustable resistance in series across said source of direct current; a vertical deflection output tube; means connecting the internal resistance of said vertical deflection tube with said vertical deflection coils, said horizontal deflection coils, and said adjustable resistance in series across said direct current source; and means connecting the internal resistance of said vertical deflection tube with said vertical deflection coils, and said secondary winding in series across said source of direct current, whereby a resistance bridge circuit having input terminals connected across said direct current source and output terminals connected across said horizontal deflection coils is formed, the adjustment of said adjustable resistance to unbalance the bridge circuit in either direction being effective to pass an adjustable amount of horizontal centering direct current through said horizontal deflection coils in either direction.

4. In a television receiver having a cathode ray picture tube of the magnetically deflected type and a deflection system therefor including a pair of series connected horizontal deflection coils; the horizontal centering system including, in combination; a source of direct current; a horizontal deflection output tube; a horizontal deflection output transformer; said transformer having a primary winding and a secondary winding; means connecting the internal resistance of said horizontal deflection tube with said primary winding, said series connected horizontal deflection coils, and said secondary winding in series across said source of direct current; an adjustable horizontal centering resistance; means connecting the internal resistance of said horizontal deflection tube, said primary winding, and said adjustable resistance in series across said source of direct current; a vertical deflection output tube; means connecting the internal resistance of said vertical deflection tube with said series connected horizontal deflection coils, and said adjustable resistance in series across said direct current source; and means connecting the internal resistance of said vertical deflection tube and said secondary winding in series across said source of direct current; whereby a resistance bridge circuit having input terminals connected across said direct current source and output terminals connected across said series connected horizontal deflection coils is formed, the adjustment of said adjustable resistance to unbalance the bridge circuit in either direction being effective to pass an adjustable amount of horizontal centering direct current through said series connected horizontal deflection coils in either direction.

5. In a television receiver having a cathode ray picture tube of the magnetically deflected type and a deflection system therefor including a pair of series connected horizontal deflection coils and a pair of vertical deflection coils, the horizontal centering system including, in combination; a source of direct current; a horizontal deflection output tube; a horizontal deflection output transformer; said transformer having a primary winding and a secondary winding; means connecting the internal resistance of said horizontal deflection tube with said primary winding, said series connected horizontal deflection coils, and said secondary winding in series across said source of direct current; an adjustable horizontal centering resistance; means connecting the internal resistance of said horizontal deflection tube, said primary winding, and said adjustable resistance in series across said source of direct current; a vertical deflection output tube; means connecting the internal resistance of said vertical deflection tube with said vertical deflection coils, said series connected horizontal deflection coils, and said adjustable resistance in series across said direct current source; and means connecting the internal resistance of said vertical deflection tube with said vertical deflection coils, and said secondary winding in series across said source of direct current; whereby a resistance bridge circuit having input terminals connected across said direct current source and output terminals connected across said series connected horizontal deflection coils is formed, the adjustment of said adjustable resistance to unbalance the bridge circuit in either direction being effective to pass an adjustable amount of horizontal centering direct current through said series connected horizontal deflection coils in either direction.

6. In a television receiver having a cathode ray picture tube of the magnetically deflected type and a deflection system therefor including a pair of series connected horizontal deflection coils and a pair of vertical deflection coils the horizontal centering system including, in combination; a source of direct current, damper means connected in series with one terminal of said source of direct current; a horizontal deflection output tube; a horizontal deflection output transformer; said horizontal output transformer having a primary winding and a secondary winding; means connecting the internal resistance of said horizontal deflection tube with said primary winding, said series connected horizontal deflection coils, and said secondary winding in series across said source of direct current; an adjustable horizontal centering resistance; means connecting the internal resistance of said horizontal deflection tube, said primary winding, and said adjustable resistance in series across said source of direct current; a vertical deflection transformer; means connecting said vertical deflection coils to said vertical deflection transformer; a vertical deflection output tube; means means connecting the internal resistance of said vertical deflection tube with said vertical deflection transformer, said vertical deflection coils, said horizontal deflection coils, and said adjustable resistance in series across said direct current source; and means connecting the internal resistance of said vertical deflection tube with said vertical deflection coils, said vertical deflection transformer, and said secondary winding in series across said source of direct current; whereby a resistance bridge circuit having input terminals connected in series with said damper means across said direct current source and output terminals connected across said series connected horizontal deflection coils is formed, the adjustment of said adjustable resistance to unbalance the bridge circuit in either direction being effective to pass an adjustable amount of horizontal centering direct current through said series connected horizontal deflection coils in either direction.

7. In a television receiver having a cathode ray picture tube of the magnetically deflected type and a deflection system therefor including a pair of series connected deflection coils; the picture centering system including, in combination; a source of direct current, rectifier means connected in series with said source, a first deflection power output tube; a deflection power output transformer; said transformer having a primary winding and a secondary winding; means connecting the internal resistance of said first tube with said primary winding, said pair of deflection coils, and said secondary winding in series across said source of direct current; an adjustable picture centering resistance; means connecting the internal resistance of said first tube, said primary winding, and said adjustable resistance in series across said source of direct current; a second deflection power output tube; means connecting the internal resistance of said second tube with said pair of deflection coils and said adjustable resistance in series across said direct current source; and means connecting the internal resistance of said second tube with said secondary winding in series across said source of direct current; whereby a resistance bridge circuit having input terminals connected in series with said rectifier means across said direct current source and output terminals connected across said pair of deflection coils is formed, the adjustment of said adjustable resistance to unbalance the bridge circuit in either direction being effective to pass an adjustable amount of picture centering direct current through said series connected deflection coils in either direction.

8. A deflection system for providing an electromagnetic field for deflecting and centering the beam of a cathode ray tube including in combination, a source of direct current, deflection coil means positioned adjacent the beam, an electron discharge valve having output electrodes n which a sawtooth current wave is developed, an output transformer having first and second winding portions, and a bridge circuit connecting said deflection coil means, said output electrodes and said winding portions to said source of potential, said bridge circuit including adjustable resistance means connected in series with said first winding portion and said output electrodes across said source of direct current and forming one bridge path, said bridge circuit also including said second winding portion and a circuit portion having substantially fixed resistance connected in series across said source of direct current and forming a second bridge path, said bridge circuit further including said deflection coil means as a diagonal circuit between said paths and connected at one end between said adjustable resistance means and said first winding portion and at the other end between said series connected portions of said second bridge path, with the value of said adjustable resistance means and said substantially fixed resistances of said second winding portion and said circuit portion being related to the resistance of said deflection coil means such that current is caused to flow through said deflection coil means in opposite directions depending upon the value of said adjustable resistance means for centering the cathode ray beam in either direction.

9. In a television receiver having a cathode ray picture tube of the magnetically deflected type and horizontal deflection coils adjacent said tube, a system for horizontal deflection and centering of the beam of the tube including in combination, a source of direct current, rectifier means connected in series with said source, a horizontal deflection power output stage including a tube having output electrodes, an output transformer having first and second windings, and resistance means, means connecting the output electrodes of said tube, said first winding and said resistance means in series in the order named across said source of direct current and said rectifier means as a first bridge path thereacross, a second bridge path connected across said source of direct current and said rectifier means including load means and said second winding connected in series, said load means having substantially fixed resistance and including shunt connected condenser means, and means connecting the horizontal deflection coils between said first and second bridge paths from the junction between said first winding and said resistance means to the junction between said load means and said second winding, whereby the value of said resistance means controls the direct current through said deflection coils and thereby controls the center position of the beam.

10. A deflection system for providing an electromagnetic field for deflecting the beam of a cathode ray tube, and for effecting the center position of the beam, said system including in combination, a source of direct current, deflecting coil means positioned adjacent the beam, an electron discharge valve having output electrodes in which a current of sawtooth wave form is developed, a transformer including first and second winding portions, resistor means having a first terminal connected to said first winding portion and a second terminal connected to said second winding portion and providing a series circuit therethrough, and circuit means connecting said series circuit to said output electrodes so that said current of sawtooth wave form flows therethrough, said circuit means connecting said output electrodes, said first winding portion and said resistor means in series across said source of direct current, said circuit means also connecting said deflection coil means in parallel across said resistor means and said second winding portion, whereby deflection current is provided in said deflection coil means through the parallel connection thereof across said second winding portion, and the direct current required by said output electrodes of said valve is supplied from said source of direct current through a first path including said resistor means and through a second path including said deflection coil means and said second winding portion in series.

11. A deflection system for providing an electromagnetic field for deflecting the beam of a cathode ray tube across a screen, and for effecting the center position of the beam on the screen, said system including in combination, a source of direct current, deflecting coil means positioned adjacent the beam, an electron discharge valve having output electrodes in which a current of sawtooth wave form is developed, a transformer including first and second winding portions, with said first and second winding portions together forming the transformer primary and said second winding portion forming the transformer secondary resistor means connected between said first and second winding portions, and circuit means connecting said first and second winding portions and said resistor means in series with said output electrodes so that said current of sawtooth wave form flows in series therethrough, said circuit means connecting said output electrodes in series with said first winding portion and said resistor means across said source of direct current, said circuit means also connecting said deflection coil means across said resistor means and said second winding portion in series so that deflection current is provided in said deflection coil means for deflecting the beam across the screen, the direct current through said output electrodes of said valve being divided between a first path including said resistor means and a second path including said deflection coil means and said second winding portion in series to thereby provide a direct current through said deflection coil means for effecting the center position of the beam.

12. A deflection system for providing an electromagnetic field for deflecting the beam of a cathode ray tube across a screen, and for effecting the center position of the beam on the screen, said system including in combination, a source of direct current, deflecting coil means positioned adjacent the beam, an electron discharge valve having output electrodes in which a current of sawtooth wave form is developed, a transformer including first and second winding portions, with said first and second winding portions forming the transformer primary and said second winding portion forming the transformer secondary, variable resistor means connected between said first and second winding portions, and circuit means connecting said first and second winding portions and said resistor means in series with said output electrodes so that said current of said sawtooth wave form flows in series therethrough, said circuit means connecting said output electrodes in series with said first winding portion and said resistor means across said source of direct current, said circuit means also connecting said deflection coil means across said resistor means and said second winding portion in series so that deflection current is provided in said deflection coil means for deflecting the beam across the screen, the direct current through said output electrodes of said valve being divided between a first path including said resistor means and a second path including said deflection coil means and said second winding portion in series so that adjustment of said resistor means controls the direct current through said deflection coil means and thereby controls the center position of the beam.

13. In a television receiver having a cathode ray tube, a deflection system including in combination, deflection coil means positioned adjacent the tube, a source of direct current, a deflection power output tube having output electrodes, a deflection power output transformer having first and second windings, means connecting the output electrodes of said tube in series with said first winding, said deflection coil means and said second winding across said source of direct current, resistor means connected in parallel with said deflection coil means and said second winding and in series with said first winding and said output electrodes of said tube across said source of direct current, and load means connected in series with said second winding and in parallel with said deflection coil means, said output electrodes and said first winding across said source of direct current, whereby a resistance bridge circuit is formed having input terminals connected across said source of direct current and output terminals connected across said deflection coil means, and the magnitude and direction of direct current flow through said deflection coil means is controlled by the value of said resistor means.

14. In a television receiver having a cathode ray tube, a deflection system including in combination, deflection coil means positioned adjacent the tube, a source of direct current, a deflection power output tube having output electrodes, deflection power output choke means having first and second winding portions, resistor means, load means, means connecting said output electrodes of said tube in series with said first winding portion and said resistor means across said source of direct current, means connecting said second winding portion in series with said load means across said source of direct current, and means connecting said deflection coil means to a first terminal between said resistor means and said first winding portion and to a second terminal between said load means and said second winding portion, whereby a resistance bridge circuit is formed having input terminals connected across said source of direct current and output terminals connected across said deflection coil means, and the magnitude and direction of direct current flow through said deflection coil means depends upon the value of said resistor means.

15. In a television receiver having a cathode ray picture tube of the magnetically deflected type and horizontal and vertical deflection coils adjacent said tube, a system for deflecting and centering the beam of the tube including in combination, a source of direct current, rectifier means connected in series with said source, a horizontal deflection power output stage including a tube having output electrodes, an output transformer having first and second windings, and adjustable resistance means connected between said windings, means connecting the output electrodes of said tube, said first winding and said resistance means in series in the order named across said source of direct current and said rectifier means as a first bridge path thereacross, a second bridge path connected across said source of direct current and said rectifier means including condenser means and said second winding connected in series, a vertical deflection power output stage coupled to the vertical deflection coils, means connecting said vertical output stage across said condenser means, and means connecting the horizontal deflection coils between said first and second bridge paths from the junction between said first winding and said resistance means to the junction between said condenser means and said second winding, whereby the adjustment of said adjustable resistance means unbalances the bridge circuit in either direction to pass an adjustable amount of beam centering direct current through the horizontal deflection coils in either direction.

GEORGE W. FYLER.
LOWELL S. KONGABLE.

References Cited in the file of this patent

UNITED STATES PATENTS

| Number | Name | Date |
|---|---|---|
| 2,216,273 | Knick | Oct. 1, 1940 |
| 2,223,990 | Holmes | Dec. 3, 1940 |
| 2,248,581 | Norgaard | July 8, 1941 |
| 2,344,736 | Schade | Mar. 21, 1944 |
| 2,401,432 | Luck | June 4, 1946 |
| 2,439,313 | Meagher | Apr. 6, 1948 |
| 2,440,418 | Tourshou | Apr. 27, 1948 |
| 2,440,786 | Schade | May 4, 1948 |
| 2,445,017 | Boadle et al. | July 13, 1948 |
| 2,469,051 | Plaistowe et al. | May 3, 1949 |
| 2,477,557 | Torsch | July 26, 1949 |
| 2,478,744 | Clark | Aug. 9, 1949 |
| 2,554,925 | Schlesinger | May 29, 1951 |
| 2,555,828 | Barco | June 5, 1951 |